United States Patent [19]

Smith et al.

[11] 4,126,653

[45] Nov. 21, 1978

[54] METHOD OF MANUFACTURING SILICON NITRIDE PRODUCTS

[76] Inventors: Dexter W. Smith, 284, Robin Hood La., Birmingham; William J. Arrol, 240, Station Rd., Solihull; Adrian C. Brennan, 11 Sumner Close, Hampton Magna, all of England

[21] Appl. No.: 667,582

[22] Filed: Mar. 17, 1976

Related U.S. Application Data

[63] Continuation of Ser. No. 197,833, Nov. 11, 1971, abandoned.

[30] Foreign Application Priority Data

Nov. 17, 1970 [GB] United Kingdom ............... 54569/70
Dec. 30, 1970 [GB] United Kingdom ............... 61747/70
Dec. 30, 1970 [GB] United Kingdom ............... 61748/70

[51] Int. Cl.² .......................................... C04B 35/58
[52] U.S. Cl. ..................................... 264/63; 264/65; 264/66; 264/320; 264/DIG. 64; 264/DIG. 66
[58] Field of Search ............... 264/148, 145, 63, 176, 264/67, 66, 65, 320, 325, DIG. 64, DIG. 66, 266

[56] References Cited

U.S. PATENT DOCUMENTS

| | | | |
|---|---|---|---|
| 2,386,604 | 10/1945 | Goetzel | 264/56 |
| 2,747,231 | 5/1956 | Reinhardt | 264/DIG. 66 |
| 2,938,807 | 5/1960 | Andersen | 264/63 |
| 3,468,992 | 9/1969 | Lubatti et al. | 264/63 |
| 3,819,786 | 6/1974 | May | 264/63 |
| 3,835,211 | 9/1974 | Coe et al. | 264/66 |

*Primary Examiner*—Donald J. Arnold
*Attorney, Agent, or Firm*—Holman & Stern

[57] ABSTRACT

In manufacturing a silicon nitride product of complex shape and uniform density, a mixture of silicon nitride in powder form together with a fluxing agent and a temporary binder is first produced. From the mixture a preform of substantially uniform density less than the density of the required product is then formed, the dimensions of the preform in the direction of subsequent hot pressing to the dimensions of the final product in the same direction being arranged to be in the ratio of the preform density to the required final density. The preform is then heated to remove the temporary binder and is hot pressed in a die carrying punches which together form a cavity defining the shape of the required product, the preform shape not conforming to the die cavity.

7 Claims, 3 Drawing Figures

METHOD OF MANUFACTURING SILICON NITRIDE PRODUCTS

This is a continuation of application Ser. No. 197,833 filed Nov. 11, 1971, now abandoned.

This invention relates to a method of manufacturing silicon nitride products.

SUMMARY OF THE INVENTION

A method, according to the invention, includes the steps of:
(a) forming a mixture of silicon nitride in powder form with a fluxing agent and a temporary binder,
(b) forming from the mixture of silicon nitride, fluxing agent and temporary binder, a preform of substantially uniform density less than the density of the required product, wherein the dimensions of the preform in the direction of subsequent hot pressing to the dimensions of the final product in the same direction are in the ratio of the preform density to the required final density,
(c) heating the preform to remove the temporary binder, and
(d) hot pressing the preform in a die carrying punches which together form a cavity defining the shape of the required product, the preform shape being non-commensurate to that of the cavity so as to form a silicon nitride product of complex shape, substantially uniform dimensions and the required density.

DETAILED DESCRIPTION OF THE PREFERRED EMBODIMENTS

Figure 1:
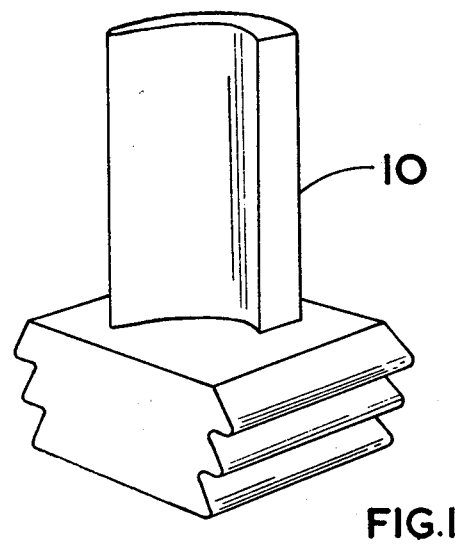
FIG. 1 is a perspective view of a silicon nitride product manufactured by a method according to one example of the invention.

Referring to the drawings, in one example of the invention in which it was required to produce a silicon nitride turbine blade, silicon nitride powder predominantly in the α-phase was intimately mixed with 1% magnesium oxide as a fluxing agent by wet ball milling for 30 minutes in propanol, the initial particle sizes of the two materials being in the region of 3 microns. After the grinding operation, the excess propanol was removed by heating and the resulting cake was crushed, screened through a 400 B.S. sieve and then mixed with a solution in water of a methyl cellulose binder so as to form a mixture having the consistency of a stiff clay. It was found that the amount and concentration of the methyl cellulose solution required to produce a mixture of the chosen consistency with a given amount of silicon nitride powder varied considerably between different batches of the powder so that for each batch it was necessary to determine the amount and concentration of the solution to be added. This was effected by taking a 100 gram charge of the silicon nitride/magnesium oxide mixture and then mixing by hand into this charge sufficient water to produce a mixture of the required consistency. The amount of water added was then determined and then the methyl cellulose binder was dissolved in the determined amount of water until no more of the binder would dissolve. The saturated binder solution thus obtained was then mixed with a further 100 gram charge of the silicon nitride/magnesium oxide mixture and the consistency of the resultant mixture was investigated. If the mixture failed to exhibit the required stiff clay-like consistency, the amount of binder present in said determined amount of water was reduced to a minimum level compatible with the production of a stiff clay which was readily extrudable and, after extrusion, produced a handleable component. In one particular example, using the silicon nitride/magnesium oxide mixture above, it was found that a suitable stiff clay was produced when the binder solution contained 2% methyl cellulose and the amount of solution added was such that the clay contained 23.5% water. This mixture was found to be extrudable without water loss and further the extruded components produced were found to exhibit reasonable strength and hence good handleability, at least for relatively small components.

Figure 2:
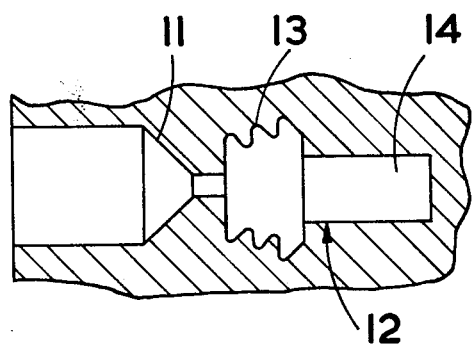
FIG. 2 is a diagrammatic illustration during one stage of the method of manufacturing the product shown in FIG. 1.

After formation of a clay mixture having the required consistency and extrudability, the mixture was injected through an extrusion nozzle 11 (FIG. 2) into a die 9 having an aerofoil form. The die was shaped so that the injection moulding operation produced a preform 12 defining the shape of a turbine blade, the mixture being injected to produce the preform in a direction parallel with a line passing centrally through the root 13 of the preformed blade and the outermost tip 14 of the blade. The density of the preform 12 was substantially constant, although less than the density of the required turbine blade. Further, the size of the die was arranged so that the dimensions of the preform in a direction perpendicular to the direction of injection, but parallel to the direction of subsequent hot pressing, were greater than the dimensions required in the final turbine blade. In fact, the size of the die was arranged so that the ratio of the dimensions of the preform 12 in the direction of subsequent hot pressing to the dimensions of the blade 10 in the same direction was equal to the ratio of the density of the preform to the density of the final product. Thus, after producing a mixture of binder, silicon nitride and fluxing agent which exhibited the required clay-like consistency, it was necessary to carry out a trial extrusion operation to discover the density of an extruded component so that the ratio of the preform to final densities and hence the size of the required extrusion die could be calculated. In the particular example described, using an extrusion pressure of 3,500 p.s.i. and after removal of the binder and the dispersant, as will be described below, the preform 12 had a density of 1.6 gm/c.c. as compared with the required density of the final product of 3.2 gm/c.c. Thus the size of the die was arranged to be such that the dimensions of the preform 12 in a direction perpendicular to the direction of injection were arranged to be greater than the final dimensions by a factor of 3.2:1.6, that is 2:1.

Figure 3:
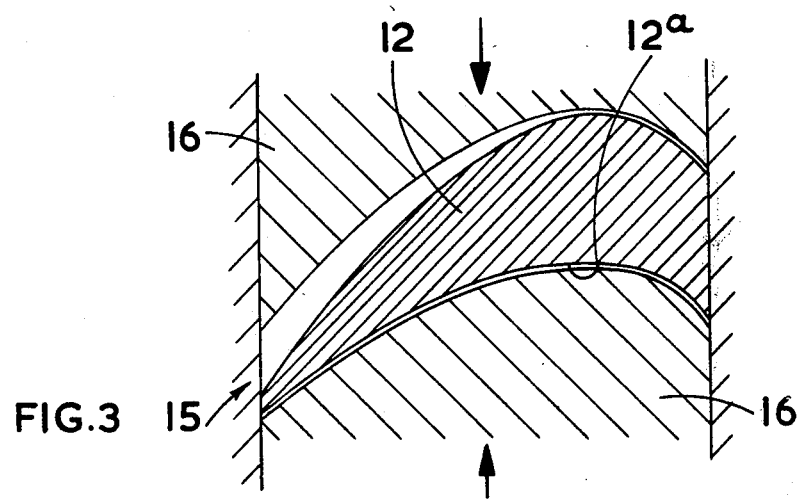
FIG. 3 is a sectional view of a preform produced during manufacture of the product shown in FIG. 1 and illustrating hot pressing of the preform into the finished product.

After removal from the extrusion die, the extruded component was heated at 450° C. in air to remove the temporary binder and the water, and as best shown in FIG. 3, the preform was then loaded into a graphite hot pressing die 15 carrying punches 16 which together defined the shape of the required turbine blade 10. It is to be noted from FIG. 3 that the shape of the preform 12 when considering a section taken in the direction of hot pressing did not correspond to the shape of the final product when considering the same section, although as previously stated the ratio of the preform to final product dimensions in the direction of hot pressing remained constant and equal to the ratio of the initial to final densities. Instead, the preform 12 was shaped so that the lower, concave surface 12a thereof conformed with the shape of the corresponding punch 16 so that, during pressing, the surface 12a mated with and was supported by the punch. Without such shaping of the preform, it was found that in producing the curved shape of a turbine blade the difference in curvature between the preform and surfaces the punches presented to the preform resulted in there being a considerable tendency for the preform to crack during hot pressing. In the particular example cited hot pressing was effected at a pressure of 3000 p.s.i. and a temperature of 1700° C. for 30 minutes, whereafter the die was cooled under pressure to ensure optimum mechanical properties.

In a second example, a mixture of silicon nitride powder with 1% magnesium oxide was prepared as in the previous example and was then mixed with a dispersion in water of an acrylate binder and sold under the trade name ACRONAL 16D. The amount and concentration of the dispersion to be added to produce a mixture having the consistency of a stiff clay was investigated in the manner described above and it was found that 4.3% by weight of the binder when added to the silicon nitride/magnesium oxide mixture as a 10% dispersion in water produced the required consistency. To extrude the mixture, however, it was found to be necessary to add about 0.1% of a silicone fluid to the mixture to improve its extrusion characteristics. After extrusion, the preform produced was processed in the same manner as described above.

In a modification of the second example, the clay-like mixture of silicon nitride, fluxing agent and acrylate binder was pressed into a preform having the required shape. Pressing of such mixture was found to be particularly desirable for the production of large preforms since the mixture tended to lose water during the pressing operation which enhanced the shape retention of the preform and also overcame the problems of shrinkage and cracking which tended to occur during oven drying of components containing larger quantities of water. As with the extrusion technique, pressing was arranged to produce a preform having a substantially uniform density less than the density of the required finished product and having dimensions greater than the required finished product in the direction of hot pressing so that the ratio of the initial and final densities of the component was equal to the ratio of the initial and final dimensions of the component. Removal of the binder from the preform and hot pressing of the preform continued as in the previous example. Where the preform was of a complex shape, such as required in the production of a turbine blade, it was found that isostatic pressing could be used to mould the mixture to the required preform dimensions.

In a third example of the invention, a mixture of silicon nitride powder predominantly in the α-phase together with 1% by weight of magnesium oxide powder in which the particle sizes of both of the powders was less than 8 microns, was prepared by wet ball milling the two materials for 30 minutes in a 16% by weight solution of cellulose nitrate in propanol, the ratio of solid to liquid then being 1:1. The excess cellulose nitrate was then filtered off so that a clay-like mixture formed comprising approximately 68.7% silicon nitride/magnesium oxide mixture, 26.3% propanol, and 5% cellulose nitrate all by weight. The excess solution of cellulose nitrate in propanol removed by the filtering was of course re-cycled to the wet ball milling stage. The clay-like mixture was found to be suitable for extrusion into a suitably shaped die and, after calculation of the size of the die required to produce the final component, a preform of substantially uniform density less than that of the required component in the direction of subsequent hot pressing was produced by extrusion into the die, whereafter the preform was hot pressed as in the previous examples.

Further solvent/binder systems were investigated and were found to produce extrudable clay-like mixtures containing silicon nitride and a fluxing agent. By way of example, a clay-like mixture containing 5% by weight of the acrylic co-polymer sold under the trade name ACRONAL 500L, added as a 10% solution in acetone, was found to be readily extrudable into a preform of substantially uniform density and good handleability properties. Similarly, dispersions in water of the acrylic polymer sold under the trade name ACRONAL 4D and the polyvinyl isobutyl ether sold under the trade name LUTANOL 165D were found to produce extrudable mixtures.

In a fourth example, a mixture of silicon nitride powder with 1% magnesium oxide, in which the particle size of each component was less than 3 microns, was mixed with 4.3% by weight of ACRONAL 16D acrylate binder, added as a 10% dispersion in water, with heat being applied to the mixture during the mixing operation. Thus, instead of the mixture producing a clay, the water dispersant was removed during the mixing operation so that a powder remained after the mixing operation was complete. The powder was then uni-axially pressed to form a body of substantially uniform density less than the density of the required finished product, but of dimensions in the direction of subsequent hot pressing greater than the dimensions of the required finished product. The press formed body was then heated at 450° C. in air to remove the acrylate binder, and provide a preform having a density of 2.0 grms per c.c. as compared with the required density of the final product of 3.2 grm per c.c. The dimensions of the preform in the direction of subsequent hot pressing were arranged to be greater than the final dimensions by a factor of 3.2:2, that is, the ratio of the final to starting densities. The preform was then loaded into a graphite die containing punches which together defined the shape of the final product and was hot pressed at 3000 p.s.i. and a temperature of 1700° C. for 90 minutes, the final product being cooled under pressure.

In a fifth example of the invention, silicon nitride powder having a particle size of 3 microns and being predominantly in the α-phase was mixed with 5% by weight of ACRONAL 16D acrylate binder added as a 10% dispersion in water. The mixture was thoroughly mixed and then dried in a tumble air drier for one hour to produce a free flowing powder. The powder was then mixed with 1% of a magnesium oxide fluxing agent, the mixture being thoroughly blended and being formed into a body of density less than that of the required product but of dimensions greater than the required product, as described in the first example. The body was then heated to remove the acrylate binder and finally was hot pressed to finished dimensions and density.

In a sixth example of the invention, silicon nitride powder of 3 micron particle size and predominantly in the α-phase was mixed with 1% magnesium oxide and a 2% mixture of alumino-silicate fibres in water using a high speed rotating disc, the alumino-silicate fibres being those sold under the trade name FIBREFRAX fibres. The mixture was then filtered and transferred into a paddle mixer together with 5% by weight of ACRONAL 16D acrylate binder, added as a 10% dispersion in water, whereafter the mixture was mixed for 6 hours. The material was heated during the mixing operation so as to form a powder and the powder was isostatically pressed, heated to remove the acrylic binder, and hot pressed to the final dimensions and density.

It is to be appreciated that whisker or fibrous inclusions could also have been incorporated in the silicon nitride powder used in the methods described in accordance with the first to third examples in which a clay-like mixture of silicon nitride, fluxing agent and binder was produced. Thus in one such example short length carbon fibres coated firstly with silicon carbide and then with silicon nitride were mixed with silicon nitride powder, a fluxing agent and a 2% solution of methyl cellulose in water so as to form an extrudable mixture. During subsequent injection moulding of this mixture preferred orientation of the fibres was found to take place, brought about during the injection of the mixture through the orifice in the nozzle 11, so that a reinforced product was thereby obtained.

It is to be understood, that, the use of the silicon nitride/flux/binder mix in powder form imposes some restriction over the complexity of shape of preform capable of being produced in a uniformly dense condition, as compared with the route involving the use of a clay-like mixture. However, under certain production circumstances a dry approach is to be preferred. Further, it is to be appreciated that where a preform is to be produced from a powder mixture of silicon nitride, temporary binder and flux the pressing operation used in the above examples to produce the preform could alternatively produce only a preliminary shaping, the formation of the preform having the required shape for pressing into the finished product then being effected by a further shaping process involving removal of material from the preform.

Further it is to be appreciated that fluxing agents other than magnesium oxide, such as manganese oxide, could have been used in the above examples.

We claim:
1. A method of manufacturing a silicon nitride product of complex shape and substantially uniform density including the steps of:
   (a) forming a mixture of silicon nitride in powder form with a fluxing agent and a temporary binder;
   (b) forming from said mixture a preform of substantially uniform density less than the final density of the product;
   (c) heating the preform to remove the temporary binder;
   (d) positioning the preform in a die cavity defined between punches which together define the shape of the product, the shape of the preform being non-commensurate with the shape of the die cavity but being of dimensions such that the product will be of substantially uniform density;
   (e) hot pressing the preform between the punches so that different areas of the preform are compressed by different amounts until the preform comforms to the shape of the punches; and
   (f) continuing said hot pressing of the preform between said punches until a substantially uniform density product is obtained.

2. The method as claimed in claim 1, wherein the dimensions of the preform in a direction parallel to the direction of hot-pressing are greater than the dimensions of the product by an amount equal to the ratio of the final density of the product to the density of the preform.

3. The method as claimed in claim 1 including the further step of mixing the silicon nitride and the fluxing agent with the temporary binder in a liquid.

4. The method as claimed in claim 3 wherein the temporary binder is dissolved in said liquid.

5. A method as claimed in claim 3 wherein the temporary binder is dispersed in said liquid.

6. The method as claimed in claim 3 wherein the mixture is of extrudable consistency and including the further step of extruding said mixture into a suitably shaped die cavity to form said preform.

7. The method as claimed in claim 1 wherein the mixture of silicon nitride, fluxing agent and temporary binder is formed by:
   (i) mixing silicon nitride in powder form with a temporary binder dispersed in a liquid,
   (ii) heating to drive off the liquid, and
   (iii) adding a fluxing agent either before or after step (ii).

* * * * *